United States Patent [19]
Place

[11] 4,092,597
[45] May 30, 1978

[54] CONFIRMATION CIRCUIT FOR A TWO-WAY COMMUNICATION SYSTEM

[75] Inventor: Harry Place, Ridgewood, N.J.

[73] Assignee: International Telephone & Telegraph Corporation, Nutley, N.J.

[21] Appl. No.: 713,303

[22] Filed: Aug. 10, 1976

[51] Int. Cl.[2] .............................................. H04B 7/00
[52] U.S. Cl. ................................ 325/53; 179/84 VF; 325/55; 325/64; 340/311; 343/177
[58] Field of Search ................. 325/165, 166, 183, 53, 325/55, 64, 37, 31; 343/225–227, 177; 340/311–313, 213.1, 213.2, 226, 408, 147 R; 178/3, 4.1 B; 331/108 C, 108 D, 154, 156; 179/84 VF, 84 T

[56] References Cited

U.S. PATENT DOCUMENTS

| | | | |
|---|---|---|---|
| 3,192,488 | 6/1965 | Faith et al. | 331/154 |
| 3,256,517 | 6/1966 | Saltzberg et al. | 340/408 |
| 3,432,773 | 3/1969 | Land et al. | 331/154 |
| 3,458,664 | 7/1969 | Adlhoch et al. | 325/55 |
| 3,559,100 | 1/1971 | Grib et al. | 331/156 |
| 3,581,283 | 5/1971 | Reddel et al. | 340/311 |
| 3,710,275 | 1/1973 | Tanaka et al. | 331/156 |
| 3,930,127 | 12/1975 | Warren et al. | 179/84 VF |
| 3,971,896 | 7/1976 | Sekiguchi | 179/84 VF |
| 4,000,379 | 12/1976 | Cowpland | 179/84 VF |

OTHER PUBLICATIONS

Signetics Corporation–"Linear Integrated Circuits"–copyright 1973, pp. 6-30 to 6-33, 6-49, 6-50, 6-80, 6-81.

*Primary Examiner*—Robert L. Griffin
*Assistant Examiner*—Marc E. Bookbinder
*Attorney, Agent, or Firm*—John T. O'Halloran; Alfred C. Hill

[57] ABSTRACT

A two-tone decoder decodes simultaneously at least two calling tones each having different frequencies coupled from a calling station to a called station and produces a first control signal upon cessation of the two calling tones. A timer responding to the first control signals produces a second control signal in the form of a pulse having a predetermined duration. A relay is activated by the second control signal and couples a confirmation tone to the calling station from a confirmation tone generator in the called station for the predetermined duration of the second control signal.

18 Claims, 2 Drawing Figures

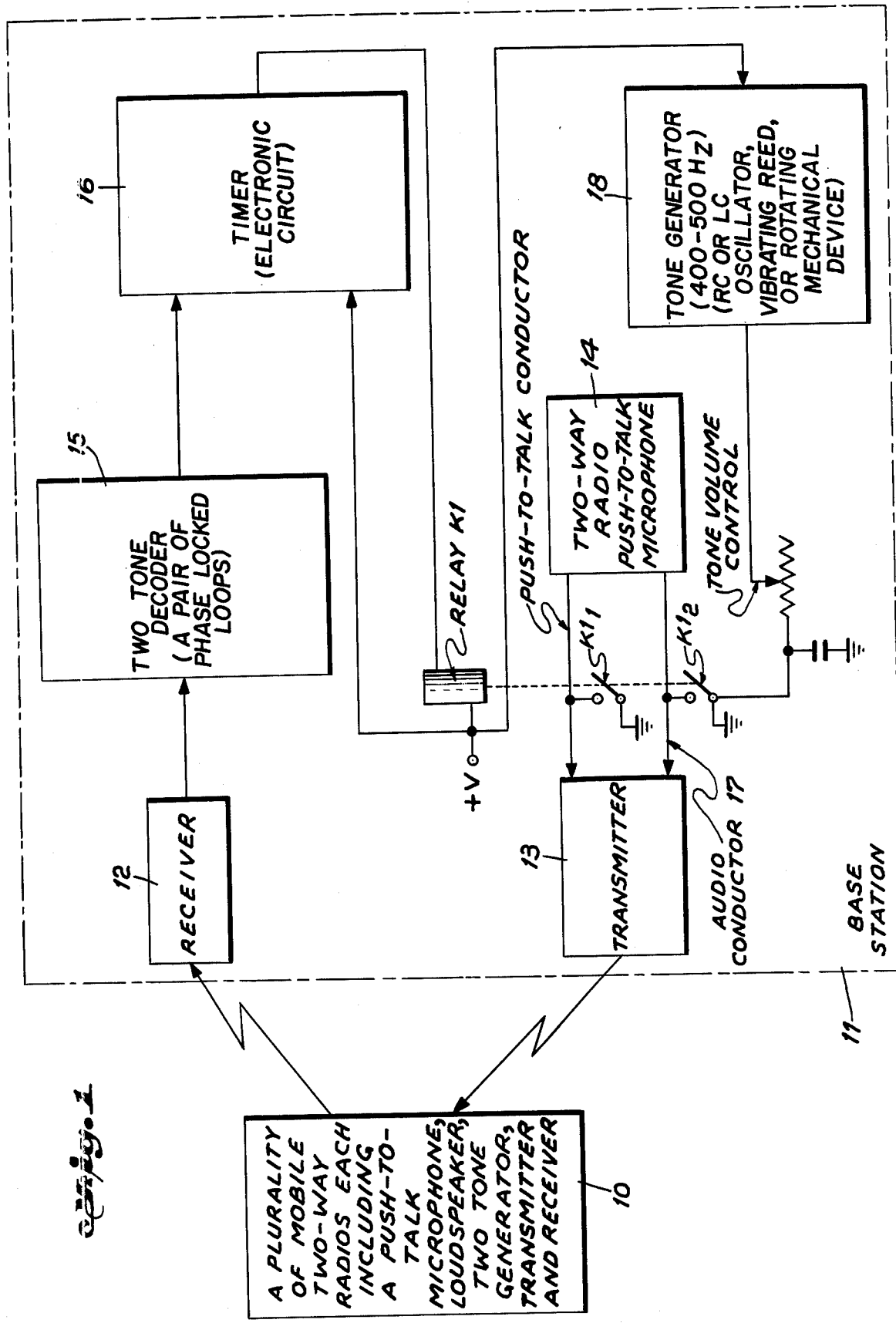

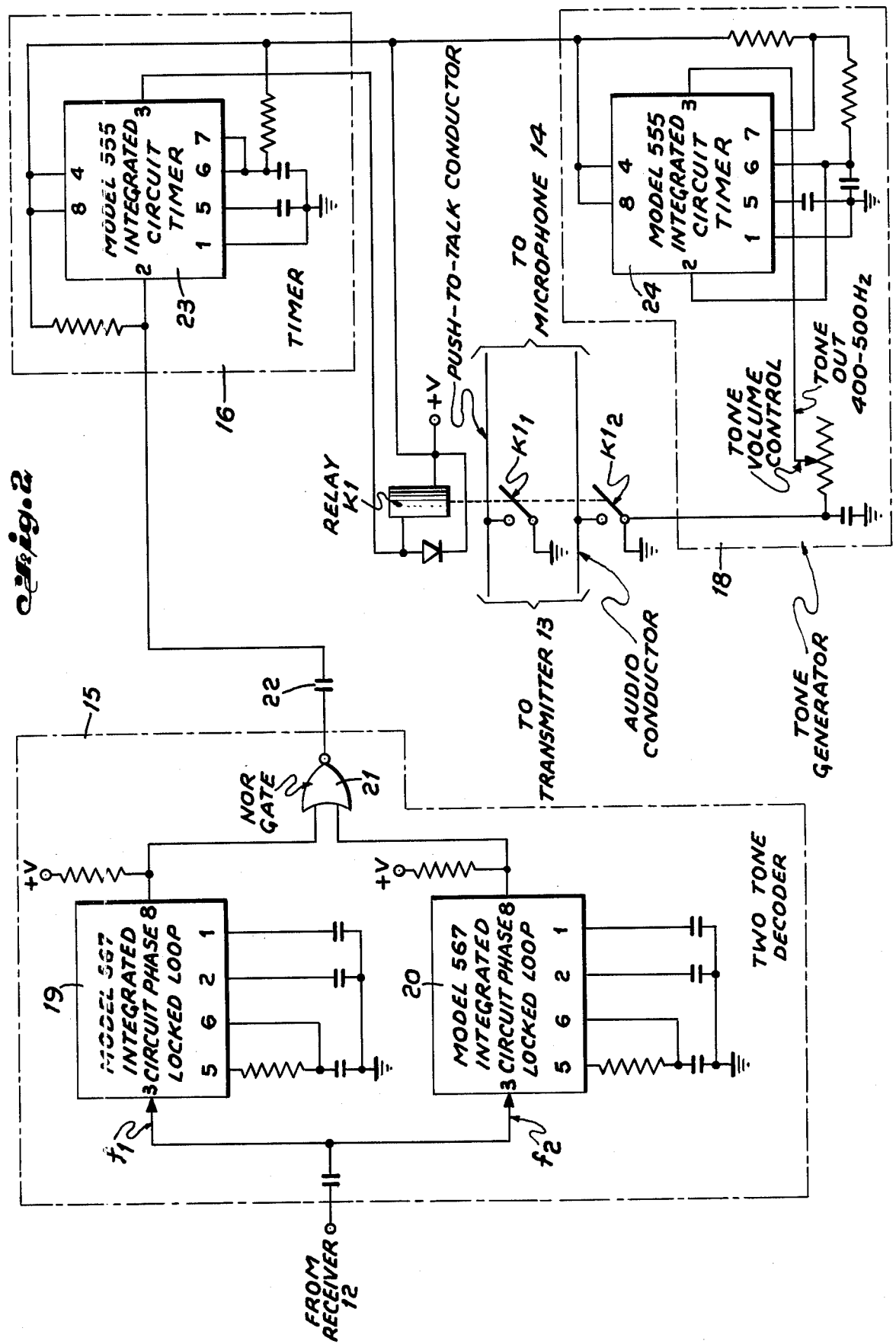

CONFIRMATION CIRCUIT FOR A TWO-WAY COMMUNICATION SYSTEM

BACKGROUND OF THE INVENTION

The present invention relates to communication systems and more particularly to a two-way communication system.

Mobile two-way radio units (calling stations) are often equipped with tone calling devices. These devices are actuated prior to a message transmission in order to alert the base station (called station) operator of the incoming message. The tones may either be used to actuate a switch in the loudspeaker circuit of the base station and thus turn the speaker on in order to receive the incoming message for the base station operator or alternatively operate a buzzer or other signaling devices to alert the base station operator that a message is waiting for service.

The advantage of tone signaling is that the radio receiver of the base station is essentially shut off until an incoming message arrives for the operator at the base station and prevents extraneous noise from distracting the operator, including noise impulses that break squelch and calls for other base stations using the same frequency.

The problem that the mobile radio unit operator faces is that when he transmits a tone call to the base station, he has no way of knowing whether or not he has actually reached the base station.

While there are many manufacturers of tone calling equipment, there are no systems in use that provide a simple automatic acknowledgement or confirmation that the base station has received the calling tones.

This same problem also occurs in two-wire or four-wire communication systems, such as in a two-way line remote control system, computer control system and the like. When an operator in these line communication systems wishes to control a remote device or the operation of a computer, the operator at the control console has no way of knowing whether or not he has actually reached the device to be controlled or the computer to be operated.

SUMMARY OF THE INVENTION

An object of the present invention is to provide an automatic acknowledgement or confirmation tone transmitted from the called station to the calling station without requiring operator intervention.

A feature of the present invention is the provision of a confirmation circuit to couple a confirmation tone to a calling station from a called station in a two-way communication system comprising: first means to decode at least two different predetermined simultaneous calling tones coupled from the calling station to the called station and to produce a first control signal upon cessation of the two calling tones; second means coupled to the first means responsive to the first control signal to produce a second control signal in the form of a pulse having a predetermined duration; and third means coupled to the second means responsive to the second control signal to couple the confirmation tone from the called station to the calling station for the predetermined duration.

BRIEF DESCRIPTION OF THE DRAWING

Above-mentioned and other features and objects of this invention will become more apparent by reference to the following description taken in conjunction with the accompanying drawing, in which:

FIG. 1 is a general block diagram of a two-way mobile communication system incorporating the confirmation circuit in accordance with the principles of the present invention; and FIG. 2 is a block and schematic diagram of one embodiment of the confirmation circuit in accordance with the principles of the present invention.

DESCRIPTION OF THE PREFERRED EMBODIMENT

The following description will be directed to a mobile radio communication system, but it is to be understood that the techniques and components described for such a system may also be employed for line communication system such as those mentioned hereinabove under the heading "Background of the Invention".

Basically the confirmation circuit of the present invention is disposed in the base station and is designed to accept two calling tones each having different frequencies. It should be noted however that the confirmation circuit of the present invention is not limited to two calling tones, but may operate upon the receipt of three or more calling tones. Upon cessation of the transmission of the calling tones from the mobile radio unit the base station transmitter responds by transmitting a momentary audio or confirmation tone burst to the mobile radio unit acknowledging or confirming to the mobile radio unit user that the calling tones have been received at the base station.

Referring to FIG. 1 the mobile communication system illustrated includes a plurality of mobile two-way radios 10 each including a push-to-talk microphone, a loudspeaker, a two-tone generator, a transmitter and a receiver. The plurality of mobile radios 10 are in communication with a base station 11 which includes therein a receiver 12, a transmitter 13 and a two-way radio push-to-talk microphone 14 and the confirmation circuit of the present invention.

The confirmation circuit of the present invention includes a two-way decoder 15 which may be a pair of, phase locked loops. The output of the two-tone decoder provides a first control signal upon cessation of the two calling tones. The first control signal triggers a timer 16 to produce a second control signal in the form of a pulse having a predetermined duration. Timer 16 may be of the electronic circuit type. During the presence of the second control signal, relay K1 is activated which closes contacts K1$_1$ and K1$_2$. The closing of the contact K1$_1$ activates transmitter 13 so that the confirmation tone coupled to the audio conductor 17 when contact K1$_2$ is in its closed position from a tone generator 18 which generates a confirmation tone in the frequency range of 400 – 500 Hz (hertz). Tone generator 18 may be of the RC or LC oscillator, vibrating reed, rotating mechanical device type. As an example, the second control signal may have a 1 second duration which will maintain relay K1 operative for 1 second which will provide a 1 second burst of confirmation tone for transmission from transmitter 13 to the particular mobile two-way radio that originally transmitted the calling tones to the base station so that the operator of this mobile radio unit will know that he has reached base station 11 and can then proceed to send his message to base station 11.

Referring to FIG. 2, there is illustrated therein one embodiment of the confirmation circuit of the present invention. The two-tone decoder 15 includes two integrated circuit phase locked loops 19 and 20 which may be a Model 567 integrated circuit phase locked loop available from many integrated circuit manufacturers, such as Signetics. The resistor and capacitors associated with each of the phase locked loops 19 and 20 determine the frequency of the tone to which it can lock. Upon receipt of a calling tone, the output of each phase locked loop 19 and 20 is a DC (direct current) signal that goes from a logic "1" to a logic "0" for the duration of the time that the calling tones are being received. The output of phase locked loops 19 and 20 each drive one input of a NOR gate 21. When tones of the correct frequency for calling are received by the phase locked loops 19 and 20 simultaneously, both inputs of NOR gate 21 go low and then the output of NOR gate 21 as a result goes high (logic "1"). The output of NOR gate 21 is coupled through capacitor 22 to the trigger input of a Model 555 integrated circuit timer 23 available from many integrated circuit manufacturers such as Signetics. Timer 23 forms part of timer 16. The resistors and capacitors connected to the various terminals of timer 23 as illustrated causes timer 23 to operate in a timing mode. Timer 23 does not respond when the output of NOR gate 21 goes from "0" to "1", i.e. during the period that the calling tones are being received at receiver 12. Upon cessation of the calling tone, however, when the mobile radio unit or calling station returns to the listening mode, the output of NOR gate 21 goes low (logic "0") thereby triggering timer 23. The timer 23 is arranged to operate relay K1 for a momentary duration of approximately 1 second and cause the associated relay contacts $K1_1$ and $K1_2$ to close. Two paths are thus closed by the relay, the first path being the push-to-talk conductor of the called station transmitter, which actuates the transmitter 13, and a second path which is the audio conductor of the called station circuit. This latter path couples an audible confirmation tone that is generated by tone generator 18 into the transmitter modulator or microphone circuit of transmitter 13. Tone generator 18 includes another Model 555 integrated circuit timer 24 which has resistors and capacitors coupled to terminals thereof as illustrated to place timer 24 in a free-running mode so as to produce a square wave output as the confirmation tone in the frequency range of 400 – 500 Hz.

The result will be the transmission of a 1 second burst of confirmation tone that can be heard at the mobile radio unit receiver upon cessation of transmission of the calling tones from the mobile radio unit transmitter. The confirmation tone is audibly heard in the mobile radio unit loudspeaker which signals the operator of the mobile radio unit that the calling tone was received at the base station and that the base station is now ready to receive a message from the mobile radio unit.

While I have described above the principles of my invention in connection with specific apparatus it is to be clearly understood that this description is made only by way of example and not as a limitation to the scope of my invention as set forth in the objects thereof and in the accompanying claims.

I claim:

1. A confirmation circuit to generate only a single confirmation tone for transmission from a base station to one of a plurality of remote two-way radios of a two-way communication system comprising:
   first means disposed in said base station to decode at least two simultaneously received calling tones each having a different frequency transmitted from said one of said plurality of remote radios to said base station and to produce a first control signal upon cessation of said two calling tones;
   second means disposed in said base station coupled to said first means responsive to said first control signal to produce a second control signal in the form of a pulse having a predetermined duration; and
   third means disposed in said base station coupled to said second means responsive to said second control signal to transmit only said single confirmation tone having a single frequency different than the frequencies of said two calling tones from said base station to said one of said plurality of remote radios for said predetermined duration to indicate that said base station is ready to receive intelligence transmitted from said one of said plurality of remote radios.

2. A circuit according to claim 1, wherein said first means includes
   a two tone decoder to detect the simultaneous presence of said two calling tones and produce said first control signal.

3. A circuit according to claim 2, wherein said second means includes
   a timer coupled to said decoder responsive to said first control signal to produce said second control signal.

4. A circuit according to claim 3, wherein said third means includes
   a tone generator to produce said confirmation tone, and
   a relay coupled to said timer, said relay having at least one contact coupled to said tone generator to couple said confirmation tone to said calling station during the presence of said second control signal.

5. A circuit according to claim 1, wherein said second means includes
   a timer coupled to said first means responsive to said first control signal to produce said second control signal.

6. A circuit according to claim 5, wherein said third means includes
   a tone generator to produce said confirmation tone, and
   a relay coupled to said timer, said relay having at least one contact coupled to said tone generator to couple said confirmation tone to said calling station during the presence of said second control signal.

7. A circuit according to claim 1, wherein said third means includes
   a tone generator to produce said confirmation tone, and
   a relay coupled to said second means, said relay having at least one contact coupled to said tone generator to couple said confirmation tone to said calling party during the presence of said second control signal.

8. A circuit according to claim 1, wherein said first means includes
   two phase locked loops each responsive simultaneously to a different one of said two calling tones, and
   a NOR gate coupled to each of said two phase locked loops to produce said first control signal.

9. A circuit according to claim 8, wherein said two phase locked loops and said NOR gate are integrated circuits.

10. A circuit according to claim 8, wherein said second means includes
- a first integrated circuit timer coupled to said NOR gate, and
- a first circuit coupled to said first timer to operate said first timer in a timing mode to produce said second control signal.

11. A circuit according to claim 10, wherein said third means includes
- a second integrated circuit timer,
- a second circuit coupled to said second timer to operate said second timer in a free-running mode to produce said confirmation tone, and
- a relay coupled to said first timer, said relay having at least one contact coupled to said second timer to couple said confirmation tone to said calling station during the presence of said second control signal.

12. A circuit according to claim 1, wherein said second means includes
- a first integrated circuit timer coupled to said first means, and
- a first circuit coupled to said first timer to operate said first timer in a timing mode to produce said second control signal.

13. A circuit according to claim 12, wherein said third means includes
- a second integrated circuit timer,
- a second circuit coupled to said second timer to operate said second timer in a free running mode to produce said confirmation tone, and
- a relay coupled to said first timer, said relay having at least one contact coupled to said second timer to couple said confirmation tone to said calling station during the presence of said second control signal.

14. A circuit according to claim 1, wherein said third means includes
- an integrated circuit timer,
- a circuit coupled to said timer to operate said timer in a free-running mode to produce said confirmation tone, and
- a relay coupled to said second means, said relay having at least one contact coupled to said timer to couple said confirmation tone to said calling station during the presence of said second control signal.

15. A circuit according to claim 1, wherein said third means includes
- a resistor-capacitor oscillator to produce said confirmation tone, and
- a relay coupled to said second means, said relay having at least one contact coupled to said oscillator to couple said confirmation tone to said calling party during the presence of said second control signal.

16. A circuit according to claim 1, wherein said third means includes
- an inductor-capacitor oscillator to produce said confirmation tone, and
- a relay coupled to said second means, said relay having at least one contact coupled to said oscillator to couple said confirmation tone to said calling party during the presence of said second control signal.

17. A circuit according to claim 1, wherein said third means includes
- a vibrating reed to produce said confirmation tone, and
- a relay coupled to said second means, said relay having at least one contact coupled to said reed to couple said confirmation tone to said calling party during the presence of said second control signal.

18. A circuit according to claim 1, wherein said third means includes
- a rotating mechanical device to produce said confirmation tone, and
- a relay coupled to said second means, said relay having at least one contact coupled to said device to couple said confirmation tone to said calling party during the presence of said second control signal.

* * * * *